(12) United States Patent
Remón et al.

(10) Patent No.: US 8,568,807 B2
(45) Date of Patent: Oct. 29, 2013

(54) METHOD FOR CLOSING THE END OF FOLDED TUBULAR CASINGS

(75) Inventors: Agustin Olleta Remón, Navarra (ES); Carlos Azcárate Gallués, Navarra (ES); Carlos Longo Areso, Navarra (ES); Esteban Martinez García, Navarra (ES); Javier Jimenez Fernández, Navarra (ES); Jesus Alustiza Cumba, Navarra (ES); Jesus Ayechu Redín, Navarra (ES); Antonio Manuel Gil Ruiz, Navarra (ES); Roberto Puente Lopategui, Navarra (ES)

(73) Assignee: Viscofan, S.A., Pamplona (ES)

( * ) Notice: Subject to any disclaimer, the term of this patent is extended or adjusted under 35 U.S.C. 154(b) by 225 days.

(21) Appl. No.: 12/922,646

(22) PCT Filed: Mar. 17, 2008

(86) PCT No.: PCT/ES2008/000151
§ 371 (c)(1),
(2), (4) Date: Dec. 7, 2010

(87) PCT Pub. No.: WO2009/115620
PCT Pub. Date: Sep. 24, 2009

(65) Prior Publication Data
US 2011/0104341 A1    May 5, 2011

(51) Int. Cl.
*A23L 1/31* (2006.01)
*A22C 13/00* (2006.01)
*B65B 7/00* (2006.01)
*B65D 30/10* (2006.01)
*A22C 13/02* (2006.01)
*A22C 11/12* (2006.01)

(52) U.S. Cl.
CPC ............. *A22C 13/0009* (2013.01); *A22C 13/02* (2013.01); *A22C 11/12* (2013.01)

USPC .............................................. 426/105; 53/476

(58) Field of Classification Search
CPC ...... A22C 11/12; A22C 13/0009; A22C 13/02
USPC ................. 426/105; 53/476; 223/42
See application file for complete search history.

(56) References Cited

U.S. PATENT DOCUMENTS 2,626,090 A * 1/1953 Horsley ........................ 223/42
3,274,005 A    9/1966 Alsys et al.
(Continued)

FOREIGN PATENT DOCUMENTS

CL              30610       10/1978
EP           0087241         8/1983
(Continued)

OTHER PUBLICATIONS

Office Action of Argentina Application No. 0607-09 Filed Mar. 13, 2009 for Viscofan, S.A.
(Continued)

*Primary Examiner* — D. Lawrence Tarazano
*Assistant Examiner* — Jerry W Anderson
(74) *Attorney, Agent, or Firm* — Notaro, Michalos & Zaccaria P.C.

(57) ABSTRACT

The invention relates to a method for closing the end of shirred tubular casings which comprises deshirring a terminal portion of the tubular casing in the direction of the axis of the stick, turning over the deshirred terminal portion in order to insert same inside the casing, securing the deshirred terminal portion from inside the casing, rotating the terminal portion and flattening the rotated terminal portion.

This method is performed at the outlet of the shirring line (ON-LINE) as an additional phase of said operation, or it is performed away from the deshirring line (OFF-LINE) as an operation independent from the deshirring.

11 Claims, 6 Drawing Sheets

(56) References Cited

U.S. PATENT DOCUMENTS

| | | | |
|---|---|---|---|
| 3,383,222 A | | 5/1968 | Alsys et al. |
| 3,892,869 A | | 7/1975 | Sheridan et al. |
| 4,411,048 A | * | 10/1983 | Green .................... 493/308 |
| 4,428,402 A | | 1/1984 | Kubo et al. |
| 5,238,443 A | * | 8/1993 | Beardsley ................ 452/46 |
| 5,445,560 A | | 8/1995 | Meeker |
| 5,897,432 A | | 4/1999 | Stall |

FOREIGN PATENT DOCUMENTS

| | | |
|---|---|---|
| EP | 0128668 | 12/1984 |
| EP | 0087241 | 5/1986 |
| EP | 294180 | 12/1988 |
| ES | 8507323 | 6/1983 |
| ES | 8507323 | 12/1985 |
| ES | 2164676 | 9/1994 |
| ES | 2164676 | 3/2002 |
| WO | WO 00/44234 | 8/2000 |
| WO | WO 01/82709 | 11/2001 |

OTHER PUBLICATIONS

Australian Patent Examination Report No. 1 for Australian Patent Application No. 2008353134.
European Official Action for European Application No. 08750392.6-1655.
Kazakhstan Official Action for Kazakhstan Application No. 2010/1604.1.
Chinese Offical Action for Chinese Application No. 200880128129.3.
Israel Official Action for Israel Application No. 207869.
Japanese Official Action for Japanese Application No. 2011-500242.
International Search Report for PCT Application No. PCT/ES2008/000151.
European Search Report for European Application No. 08750392.6-1655.

* cited by examiner

METHOD FOR CLOSING THE END OF FOLDED TUBULAR CASINGS

OBJECT OF THE INVENTION

The object of the present invention relates to a method for closing the end of shirred tubular casings necessary for said tubular casings to be suitable for being filled with meat products.

The great advantage of said method is that it is performed both at the outlet of the shirring line (on-line), and away from the shirring line (off-line) as an additional phase of said deshirring operation or in an independent operation, so that once these tubular casings are stored and packaged they are ready to be used for filling meat products.

BACKGROUND OF THE INVENTION

It is a common operation in tubular casings, whether they are made of collagen, cellulose, plastic, etc., for them to be manufactured in the form of cylindrical tubes formed by the shirred casing itself in order to occupy the smallest space possible, i.e., the walls of the casing forming a zigzag, whereby having a compact and very consistent construction of shirred tubular casing. When filling these shirred tubular casings with meat products, the pressure of the filled meat product forces the deshirring of the tubular casing. These cylindrical tubes of tubular casing are commonly referred to as sticks and are supplied in the form of packets in which a determined number of them suitably wrapped and preserved from any contamination are grouped.

After manufacturing the tubular casing, a long reel is produced which, once shirred and cut, is transformed into sticks, for example 28 meters of smooth casing in a 30 centimeter stick. This shirring process produces a cylindrical tube having thick walls formed by the material of the shirred and compacted casing. However in order to be usable in filling food products, it is necessary to close one of the ends of this tube and for said end to resist the pressure of the initial filling because the correct filling of sausages depends on this. In the event that the closure does not resist said pressure, the filled food mass would leak out without being filled since the casing would not continue to be deshirred, resulting in the loss of fillable product stopping production.

Multiple methods have been developed in the state of the art to obtain a reliable closure of the ends of these sticks, including European patent EP 294180 of the company DEVRO INC. This patent attempts to automatically reproduce what would usually be done manually, i.e., it ties an end knot in the casing which securely resists the filling pressure. This extremely complex machine cannot be used as an additional phase of the shirring process but rather it must be used as an individual machine because it requires performing complex and slow operations for tying the knot. This knot-tying machine requires deshirring the end of the stick along a considerable length up to the end tied in a knot, so once the knot is tied, there is an extracted portion of casing which makes the storage thereof difficult, and finally the insertion of these stick in the filling machine is slower due to the elongated ends produced after the knot-tying operation.

International application WO00/44234 describes a method for closing the ends of collagen casings by means of heating and melting the collagen of an end part of the mentioned casings, this melting softening the collagen in that heated area, melting the walls of the casing and subsequently crystallizing said collagen end by cooling. This crystallization of the collagen translates into an extremely hard and brittle terminal area in which by means of trimming the end, the attempt is made to minimize this extreme hardness which can damage other stored casings and this brittleness can even result in breaking the casing at the beginning of the filling process so precaution must be taken with the filling pressures used.

European patent EP 128668 uses the same approach of heating the terminal end of the casing. In this invention, the method is performed from outside the casing, a first twisting of the end and a subsequent heating melting the twisted end and final cutting of the excess portion being produced. By means of heating, this solution produces an unwanted crystallization of the end, as previously mentioned.

U.S. Pat. No. 3,383,222 describes a method of making the terminal ends of the tubular casings using the concept of turning over the mentioned casing, inserting it in the stick itself. This invention consists of first performing a deformation of the end of the casing such that it closes the central hole of the tubular casing, to then insert a piston inside the tubular casing, which deshirrs the end of the tubular casing by inserting it in same. A second piston is subsequently inserted from the back end which flattens this deshirred material, the closure end being thus formed. This method is somewhat complicated for forming the terminal end because the dragging of the casing by the first piston is rather irregular due to the shape which is produced, obtaining areas with a large accumulation of casing and others with less accumulation, so in order to obtain a resistant closure it must be shirred along a rather considerable length of the casing, thereby resulting in a terminal end that is too rigid and unpleasant once the food product is filled.

U.S. Pat. No. 3,274,005 must finally be mentioned, the end closure of which of the casing is performed from inside the tubular casing, inserting a tool on which the end of the casing is secured, turning the tool, which turns the casing, and subsequently retracting the tool towards the inside of the casing, at which time the mentioned tool is retracted. The casing thus made has an outer terminal end that is visually pleasing, although inside it there is a casing area which is mixed with filled meat that is rather unpleasant at consumption making it necessary to dispose of the terminal ends of the sausages or filled products because of how unpleasant it is to have a portion of casing mixed with the actual filled meat mass.

DESCRIPTION OF THE INVENTION

An object of the invention is to make an end closure of shirred tubular casings which prevents heating and melting the material of the tubular casings and therefore their crystallization, preventing areas of extreme hardness at the terminal end of the tubular casings.

Another object of the invention is to obtain a terminal end without a considerable waste of material that is highly resistant for the automatic filling process and the outer appearance of which is as visually pleasing as possible.

This invention can work ON-OFF line in the shirring machine, i.e. forming part of the shirring line or as an operation independent from the shirring.

The invention proposes a method for closing the end of shirred tubular casings, whether they are made of collagen, cellulose, plastic, etc., which comprises:
  deshirring a terminal portion of the tubular casing in the direction of the axis of the stick
  turning over the deshirred terminal portion in order to insert same inside the casing
  securing the deshirred terminal portion from inside the casing rotating the terminal portion flattening the rotated terminal portion.

The proposed method starts with deshirring the terminal portion of the tubular casing, which deshirring comprises the phases of:

securing an end portion of the shirred casing stretching and deshirring the end portion of the tubular casing trimming the deshirred portion.

Securing, stretching and deshirring the end portion of the tubular casing is performed by means of mechanical means, such as for example by means of at least one clamping element, which clamping element secures the tubular casing from its end and subsequently stretches the same in a determined magnitude. This clamping element shifts in the direction of the axis of the shirred stick of the tubular casing, whereby making use of the linear axis of the tubular casing to perform the deshirring of the end of the casing on the same axis.

This clamping element performs the following operations to deshirr the end of the tubular casing:

moving closer until contacting with the terminal end of the shirred stick of the cellulose casing clamping with the subsequent trapping of the tubular casing retracting the clamping element releasing the tubular casing.

With this operation a tubular casing will have been obtained with its end deshirred in a small magnitude, enough to perform a secure closure of the end without involving the risk of the automatic fillers being able to break the end closure knot.

The following operation to be performed consists of turning over this end of the deshirred casing, it being suitable as a step prior to said turning over of the deshirred terminal portion to insert a tubular element inside the shirred casing, which insertion is performed through the end opposite the one which has been deshirred, this tubular element being the one which performs guiding functions in the phase of turning over.

The deshirred terminal portion is turned over by means of a method which consists of:

flattening the deshirred terminal portion dragging the deshirred and flattened terminal portion into the tubular casing.

This flattening obtains a firm wall for dragging by means of an element which inserts the deshirred terminal portion inside the casing or inside the tubular guiding element. The deshirred terminal portion is dragged by means of a tongue which is inserted inside the tubular casing and drags it to the inside of the casing or of the tubular guiding element.

The action of the tongue is accompanied by that of a hold-down plate which secures the shirred terminal portion of the stick preventing the action of the tongue from deshirring a portion greater than the already deshirred portion and such that the deshirred portion covers the tubular guiding element.

The hold-down plate which secures the shirred terminal portion has an annular shape and the tongue is inserted inside the hold-down plate, because the hold-down plate must secure the shirred tubular casing, whereas the tongue must attack the casing to insert the deshirred terminal portion into the hollow inside of said casing.

To prevent excessive pressure of the hold-down plate on the tubular casing, said pressure is regulated by means of the action of a pressure spring which is tared at a determined pressure that is sufficient to prevent the deshirring of a larger portion of casing when the tongue inserts it inside the shirred casing or the tubular guiding element, however it is not so excessive so that it can deteriorate the tubular casing.

Once the deshirred terminal portion is inserted inside the tubular casing or inside the tubular guiding element, the phase of closing said end begins, for which purpose a clamping element is used which initially grips this end from outside to then clamp same, i.e., it presses it, to then rotate the clamping element, causing it to twist the deshirred terminal portion over itself when the hold-down plate is still pressing the tubular casing, preventing the twisting of this end area from being able to be transmitted to the tubular casing that has not been deshirred.

This clamping element is bound to a closure tube by means of an attachment sliding in the axial direction of both bodies and rigid in the radial direction which facilitates the joint rotation of both bodies. The relative axial movement between the clamping element and the closure tube causes the opening or closure of the clamping element, whereas the rotational movement between the clamping element and the closure tube is continuously transmitted and in any situation whether the clamping element is opened or closed.

Once the deshirred terminal portion of the tubular casing has been twisted, the phase of mechanical flattening of said rotated terminal portion begins, for which the same is compacted by pressure. Flattening the terminal portion is achieved from inside the tubular casing by means of a packer which flattens it against a stop, leaving this terminal end twisted while at the same time flattened, this closure withstanding a high filling pressure without having heated it and without the crystallization of the material forming the casing. This flattening obtains a higher capacity of withstanding the filling pressure of the tubular casing.

It must be pointed out that one of the great advantages of said method is that it is carried out in the production line of the shirred tubular casings, thereby preventing intermediate storages thereof, but rather once the casings are shirred, they are closed at their ends in order to be suitable for the automatic filling with meat products therein.

The invention also relates to the shirred tubular casing itself in which the terminal end thereof is mechanically rotated and flattened, being distinguished from the state of the art such that it is neither tied in a knot nor heated, but rather it is mechanically twisted and flattened.

BRIEF DESCRIPTION OF THE DRAWINGS

To complete the description which is being made and for the purpose of aiding to better understand the features of the invention, a set of drawings is attached to the present specification as an integral part thereof in which the following has been depicted with an illustrative and non-limiting character.

DETAILED DESCRIPTION OF A PREFERRED EMBODIMENT OF THE INVENTION

Figure 1:
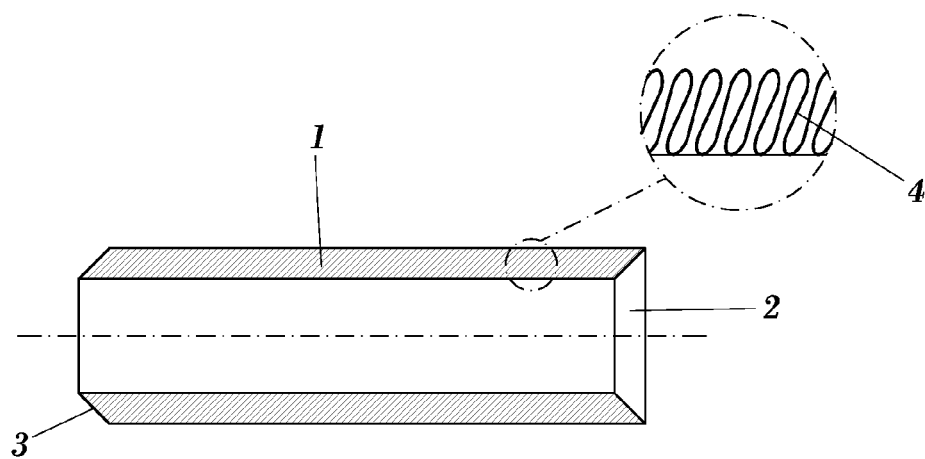
FIG. 1 depicts the reception of the tubular casing or stick to begin the method for closing the end thereof.

FIG. 1 depicts the reception of the tubular casing (1) or stick for beginning the method for closing the end thereof. This casing has a front end (2) and a back end (3), said tubular casing being formed by means of zigzag shirring as is shown in detail (4) of FIG. 1.

Figure 2:
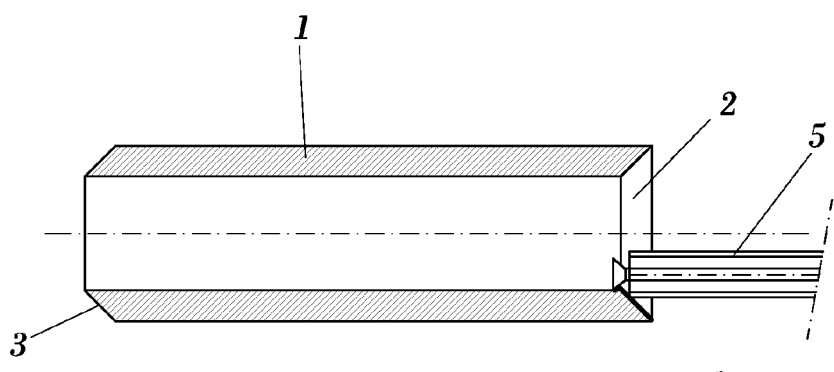
FIG. 2 depicts the beginning of deshirring the end portion by means of moving the clamping element closer.
Figure 3:
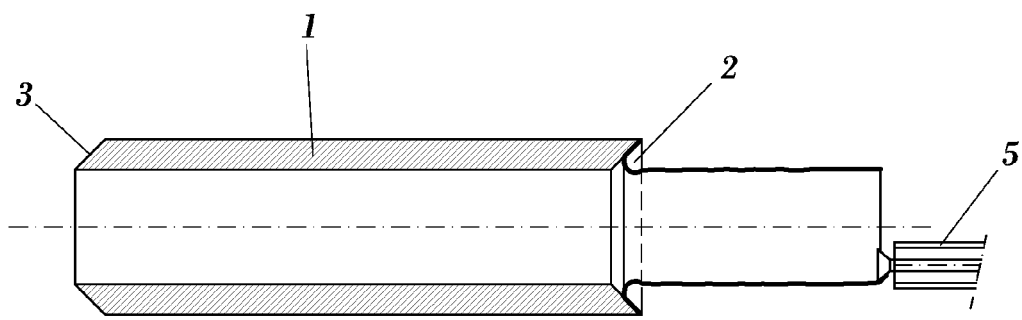
FIG. 3 depicts the stretching once the clamping element has secured the end of the tubular casing.
Figure 4:
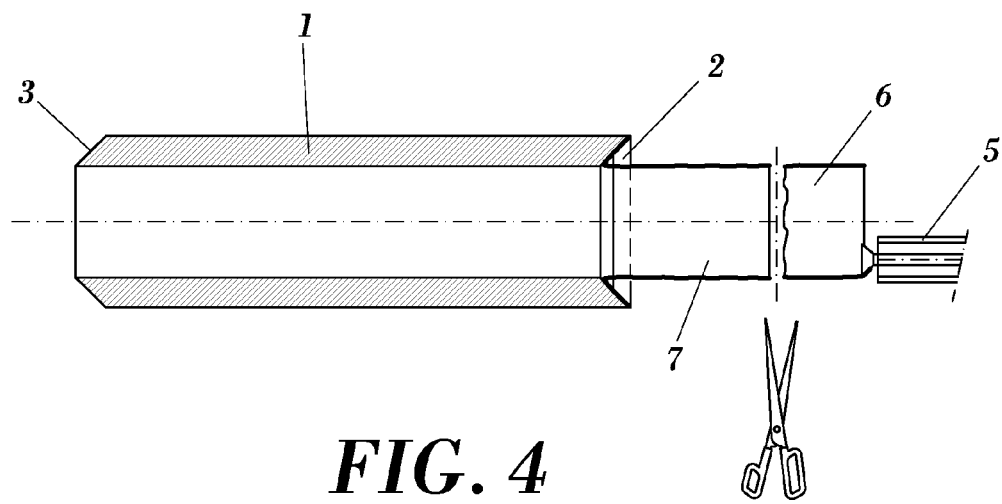
FIG. 4 depicts the trimming of the end of the deshirred casing for fixing an deshirred maximum end portion.

FIGS. 2 to 5 shows the process of deshirring the front end (2) of the tubular casing (1). This process of deshirring begins by moving the clamping element (5) closer, which clamping element moves closer to the front end (2) of the tubular casing, secures the casing as shown in FIG. 2 and deshirrs an area of the casing by being retracted, which area is subsequently fixed at a specific magnitude of deshirred end portion (7) of the casing by means of cutting, as is indicated in FIG. 4. The waste area (6) that is secured to the clamping element (5) once cut is released by the clamping element (5), being withdrawn as waste and leaving the clamp prepared to begin its operation with the next tubular casing (1).

Figure 6:
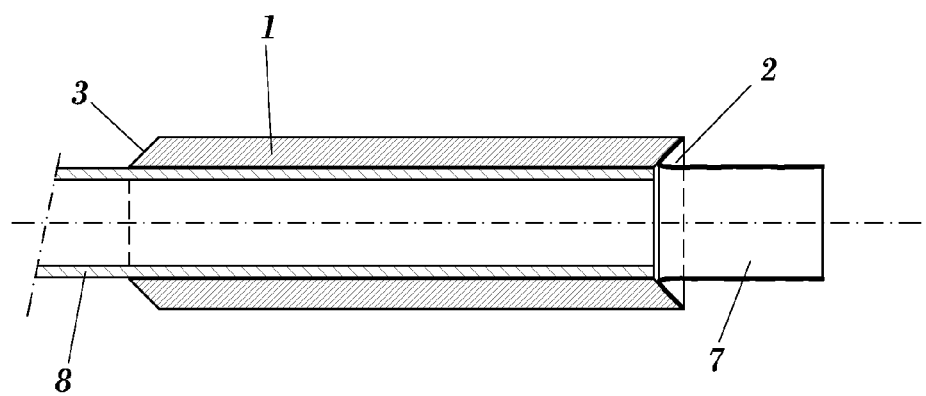
FIG. 6 depicts the insertion of the tubular guiding element through the end opposite the one of the deshirring of the end portion of the tubular casing.

FIG. 6 depicts the insertion of the tubular guiding element (8) through the back end of the tubular casing until placing it inside the mentioned tubular casing (1).

Figure 7:
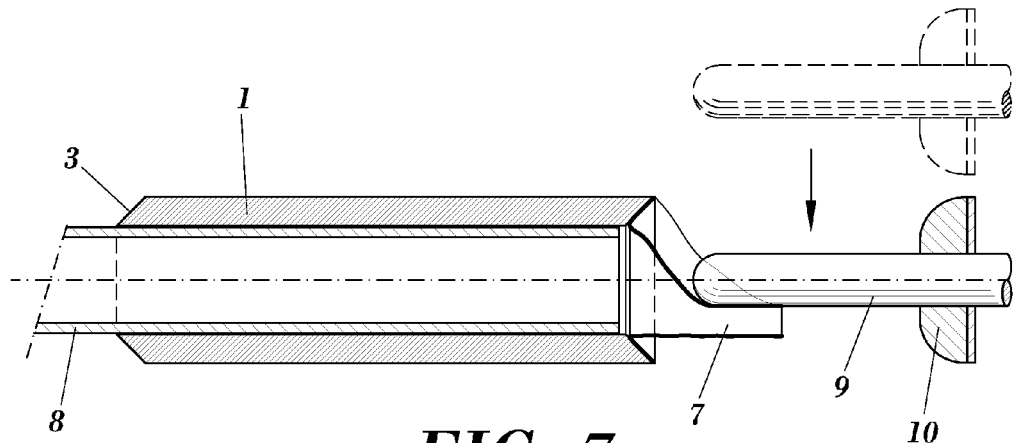
FIG. 7 depicts the beginning of turning over the deshirred end portion of the tubular casing by means of insertion with the tongue.

FIG. 7 depicts the beginning of turning over the deshirred portion (7) of the tubular casing (1), for which purpose it begins by flattening the deshirred portion (7) by means of the tongue (9) which is aligned with the axis of the tubular casing (1).

Figure 8:
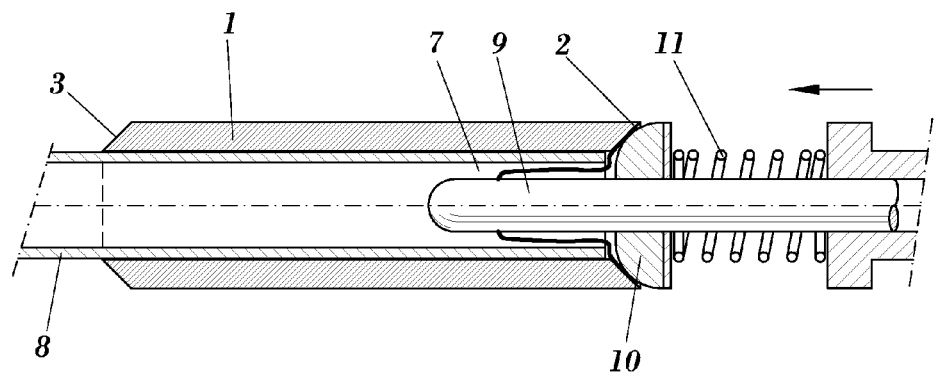
FIG. 8 depicts the combined action of the tongue and hold-down plate which perform the turning over of the end portion of the tubular casing.

FIG. 8 shows how the hold-down plate (10) contacts with the front end (2) of the tubular casing, pressing it and preventing it from deshirring in a greater magnitude. This hold-down plate (10) presses the tubular casing by means of the action of the spring (11). Once this operation is performed, the tongue (9) is inserted inside the tubular casing (1) and the tubular guiding element (8), the deshirred portion (7) remaining inside the tubular guiding element (8). It should be pointed out that it is of interest for the entire deshirred portion to be tubular when turned over.

Figure 9:
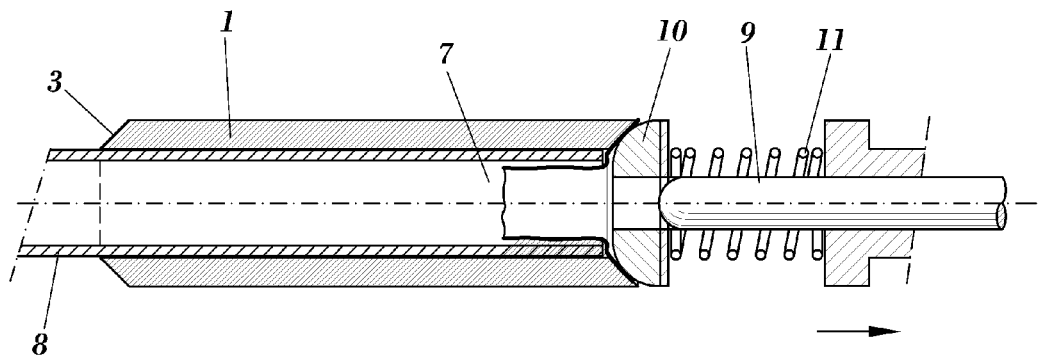
FIG. 9 depicts the insertion of the end of the tubular casing inside the guiding element inside the casing and the retraction of the tongue.

FIG. 9 depicts the withdrawal of the tongue (9) and how the deshirred portion (7) is inside the tubular guiding element (8).

Figure 10:
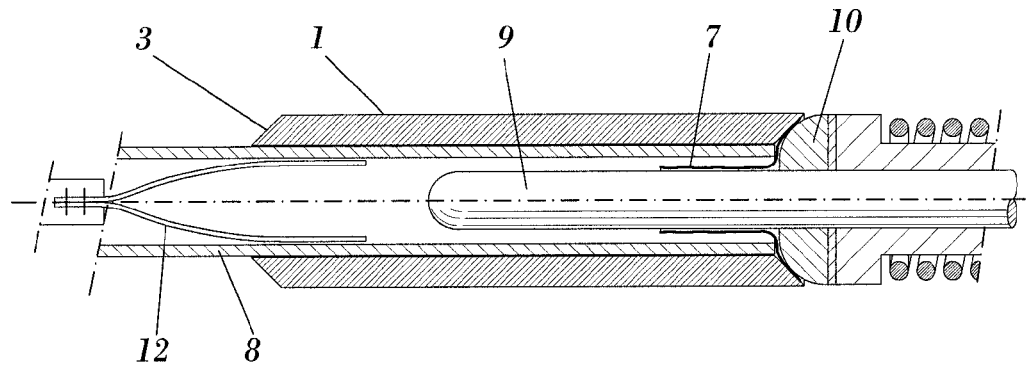
FIG. 10 depicts moving the clamping element closer from inside the casing.
Figure 11:
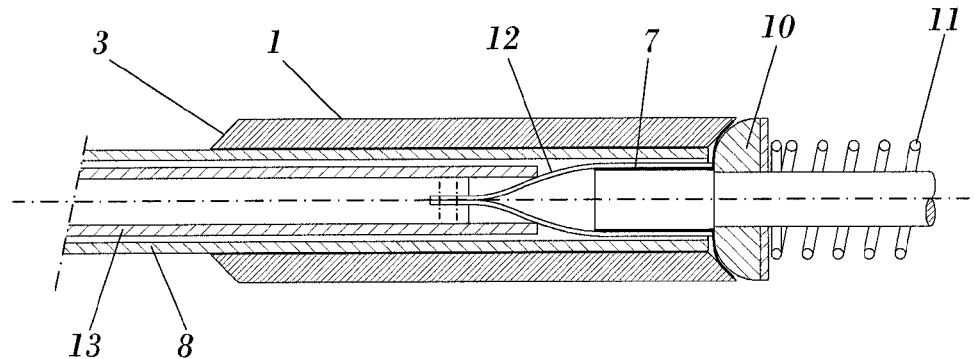
FIG. 11 depicts the capture of the end of the casing by the clamping element.

FIG. 10 depicts the forward movement and insertion of the clamping element (12) through the tubular guiding element and how it moves towards the meeting point of the deshirred portion (7) of the tubular casing (1), the method continuing in FIG. 11 where it can be seen how the clamping element (12) is attached to the closure tube (13) and how this clamping element (12) has been coupled by enveloping the deshirred and turned over portion (7). While this operation is performed, the hold-down plate (10) presses the front end of the tubular casing (1).

Figure 12:
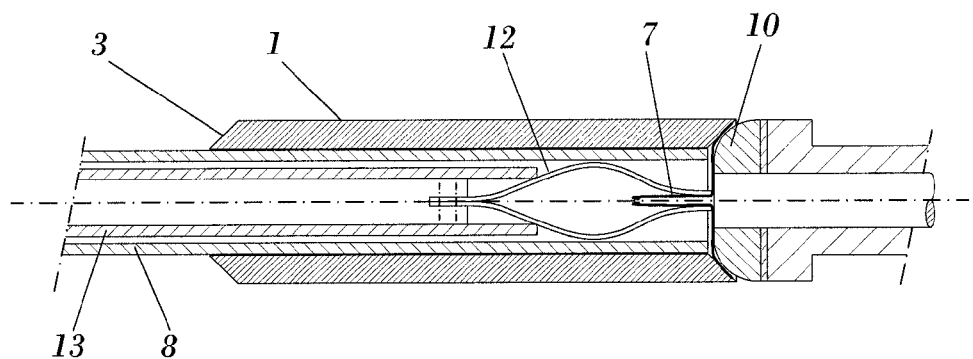
FIG. 12 depicts the closing of the end of the casing by the clamping element, and how same rotates once clamped.
Figure 13:
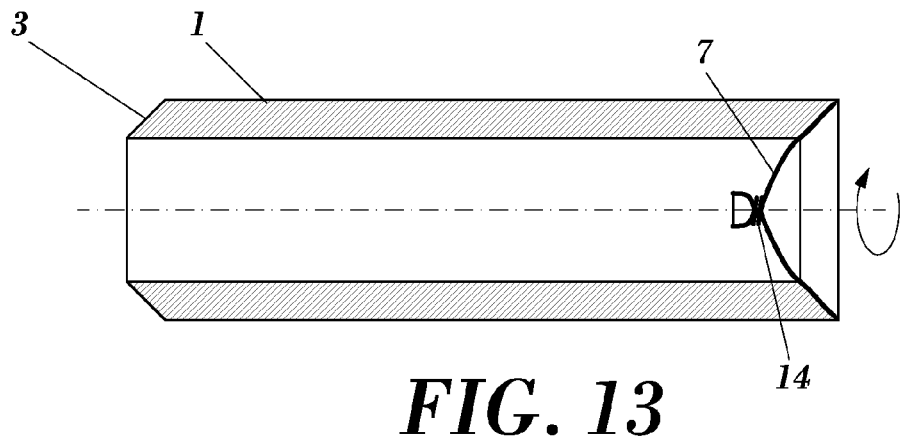
FIG. 13 depicts the twisting effect on the end of the tubular casing.
Figure 14:
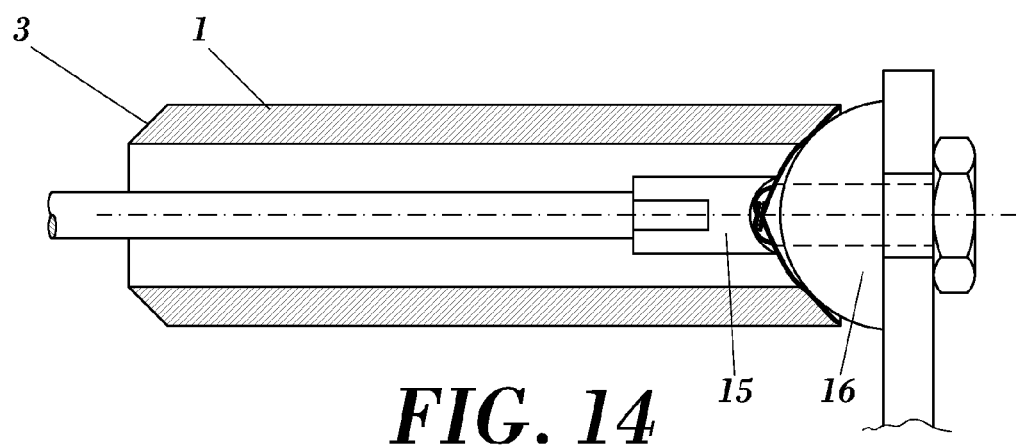
FIG. 14 depicts the flattening operation of the end of the tubular casing.

In FIG. 12 shows how the closure tube (13) moves forward with respect to the clamping element (12) and how the clamp closes the deshirred end portion. Then, said clamping element (12) and the corresponding closure tube (13) are rotated several turns, twisting the end of the tubular casing which will remain twisted, forming a closure (14) as is seen in FIG. 13.

Figure 5:
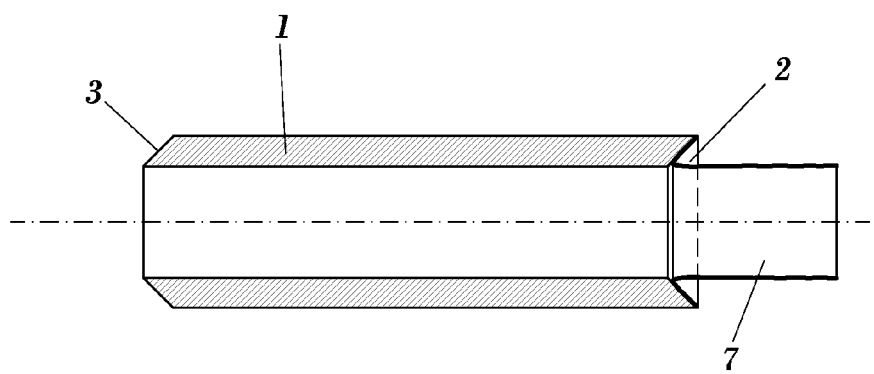
FIG. 5 depicts an image of the tubular casing with the end deshirred and how the clamping element has been withdrawn.
Figure 15:
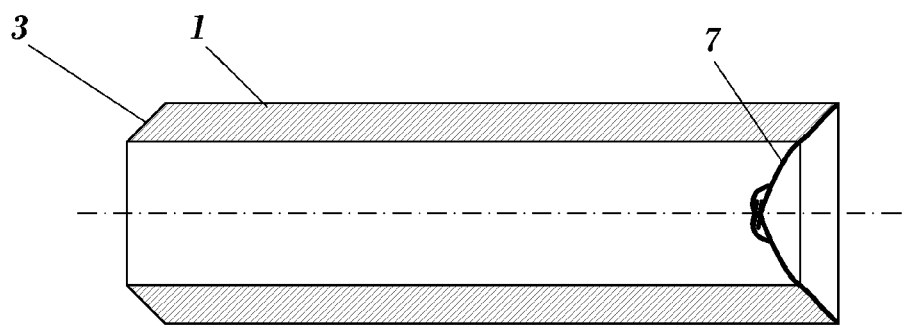
FIG. 15 depicts the tubular casing with the end closed by means of mechanical twisting and flattening, and how it is placed towards the inside of the tubular casing.

Subsequently, the method continues with the withdrawal of the clamping element (12) and corresponding closure tube (13) in order to insert the packer (15) and packer support (16) inside the shirred tubular casing, as is shown in FIG. 5, pressing the closure (14) and flattening it so that it is in the correct position, as is shown in FIG. 15, where the closure is retained inside the tubular casing (1) and the flattened closure (14) remains inside the casing arranged for the storage and subsequent use in the filling machines.

Figure 16:
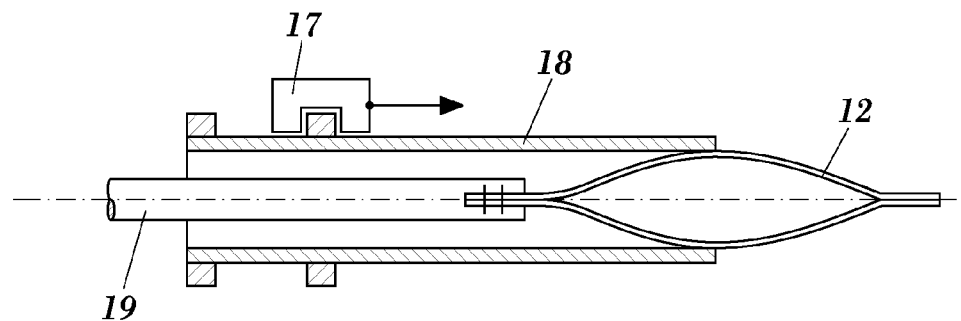
FIG. 16 separately depicts the clamping element, and how said clamp acts when opening and closing.
Figure 17:
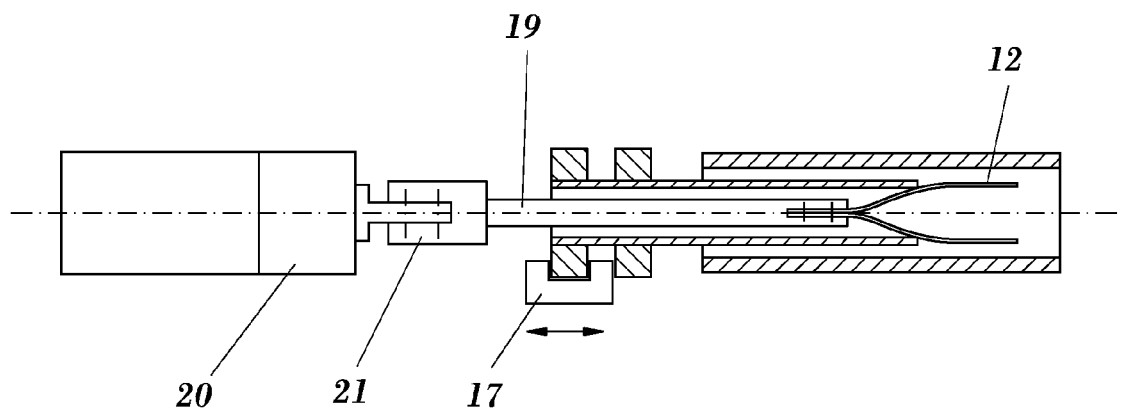
FIG. 17 schematically depicts the opening or closing device of the clamp and the rotational movement thereof.

FIGS. 16 and 17 are complementary, so they will be described together. These figures show how the closure tube (13) breaks down into two parts, on one hand, the rotation transmission shaft (19) which envelops the clamping element (12) through the closure tube-clamp (18) which is moved by the actuator (17). The shifting of this actuator moving the closure tube-clamp forwards or backwards makes the clamping element (12) open or close, trapping the end of the tubular casing. FIG. 17 is provided as a depiction of the actuation of the rotation transmission shaft (19) which is performed by means of a geared motor (20) and coupling (21).

The invention claimed is:

1. A method for closing the end of shirred tubular casings comprising the steps of:
  deshirring a terminal portion of the tubular casing in the direction of the axis of the stick;
  turning over the deshirred terminal portion in order to insert same inside the casing;
  securing the deshirred terminal portion from inside the casing;
  rotating the deshirred terminal portion; and
  flattening the rotated terminal portion after the rotation step is complete
  wherein the step of deshirring the terminal portion comprises:
  securing an end portion of the shirred casing;
  stretching and deshirring the end portion of the tubular casing; and
  trimming the deshirred portion of the casing; and
  wherein the steps of securing, stretching and deshirring the end portion of the tubular casing each comprise the use of an external clamping element.

2. The method for closing the end of shirred tubular casings according to claim 1, wherein the step of stretching and deshirring the end portion of the tubular casing comprises an external clamping element clamping the tubular casing and then moving in the direction of the axis of the shirred stick of the tubular casing.

3. The method for closing the end of shirred tubular casings according to claim 1, wherein the steps of securing the deshirred terminal portion from inside the shirred tubular casing and of rotating the terminal portion comprise the use of -an internal clamping element performing the following:
  moving closer to the deshirred terminal portion of the casing until contacting it;

clamping and thereby trapping the casing;
rotating the casing;
releasing the casing;
retracting the internal clamping element;
wherein the internal clamping element clamps and rotates the casing without first axially compressing the casing; and
wherein the internal clamping element clamps the casing using a pincer motion.

4. The method for closing the end of tubular casings according to claim 1, wherein a movable tongue and a movable hold-down plate are provided, and further comprising that the action of the tongue is accompanied by that of the hold-down plate which secures the shirred tubular casing preventing the action of the tongue from deshirring a portion greater than the deshirred portion.

5. The method for closing the end of tubular casings according to claim 4, wherein the tongue is slidably positioned within the central area of the hold-down plate.

6. The method for closing the end of tubular casings according to claim 4, wherein the hold-down plate secures the shirred tubular casing during the step of turning over the deshirred terminal portion in order to insert the deshirred terminal portion inside the casing by exerting pressure on the casing,
and wherein the pressure of the hold-down plate is regulated by means of the action of a pressure spring.

7. The method for closing the end of tubular casings according to claim 1, wherein a hold-down plate which secures the shirred terminal portion during the step of turning over the deshirred terminal portion and inserting the deshirred portion inside the casing has an annular shape.

8. The method for closing the end of tubular casings according to claim 1, wherein an internal clamping element is provided, and wherein the step of securing the deshirred terminal portion from inside the casing comprises the use of the internal clamping element inserted in the shirred casing; and
wherein the internal clamping element clamps the deshirred terminal portion without first axially compressing the deshirred terminal portion; and
wherein the internal clamping element clamps the deshirred terminal portion in the manner of a pincer.

9. The method for closing the end of tubular casings according to claim 8, wherein the step of rotating the deshirred terminal portion comprises rotating the internal clamping element causing the deshirred terminal portion to twist over itself.

10. The method for closing the end of tubular casings according to claim 8, wherein a closure tube is provided, and wherein the internal clamping element is bound to the closure tube by means of an attachment which is slidable in the axial direction of both bodies and which is rigid in the radial direction, thereby facilitating the joint rotation of both bodies.

11. The method for closing the end of tubular casings according to claim 10, wherein the relative axial movement between the internal clamping element and the closure tube causes the opening or closure of the clamping element;
wherein the closure tube is not a part of the tubular casing.

* * * * *